Sept. 17, 1929.　　　　J. JONAS　　　　1,728,288
RECTIFICATION OF POLYPHASE ELECTRICAL CURRENT
Filed March 6, 1926　　　2 Sheets-Sheet 1
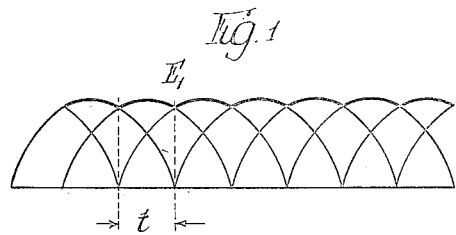
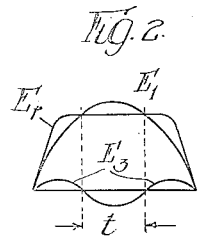
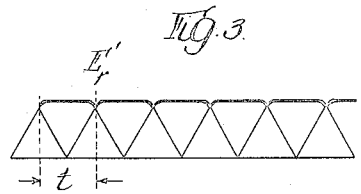
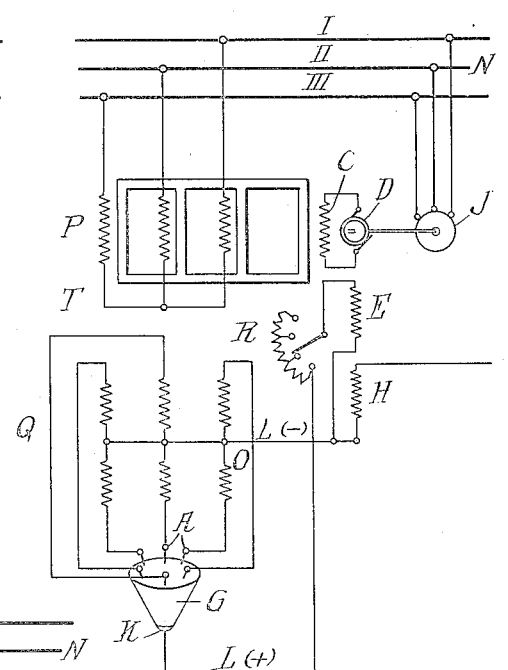
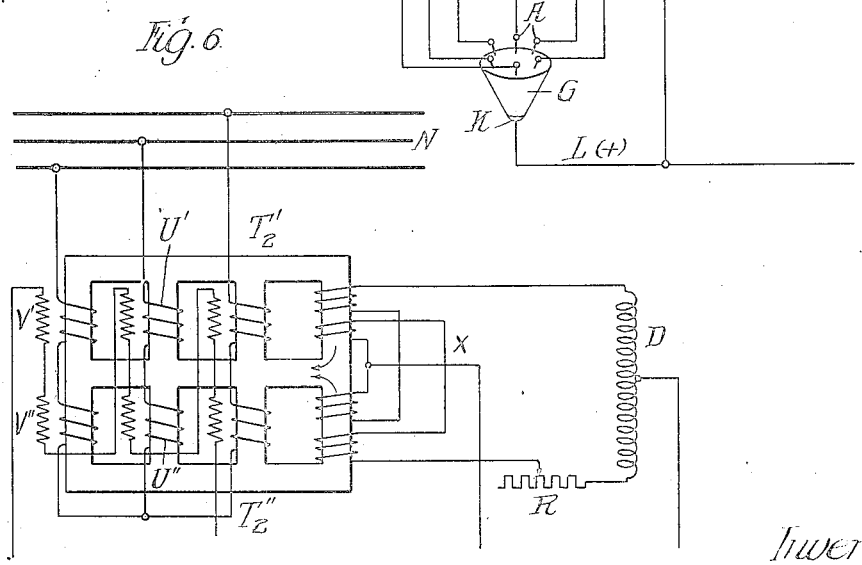
Inventor:
Julius Jonas,
By Cromwell, Greist...
attys.

Sept. 17, 1929.   J. JONAS   1,728,288
RECTIFICATION OF POLYPHASE ELECTRICAL CURRENT
Filed March 6, 1926   2 Sheets-Sheet 2
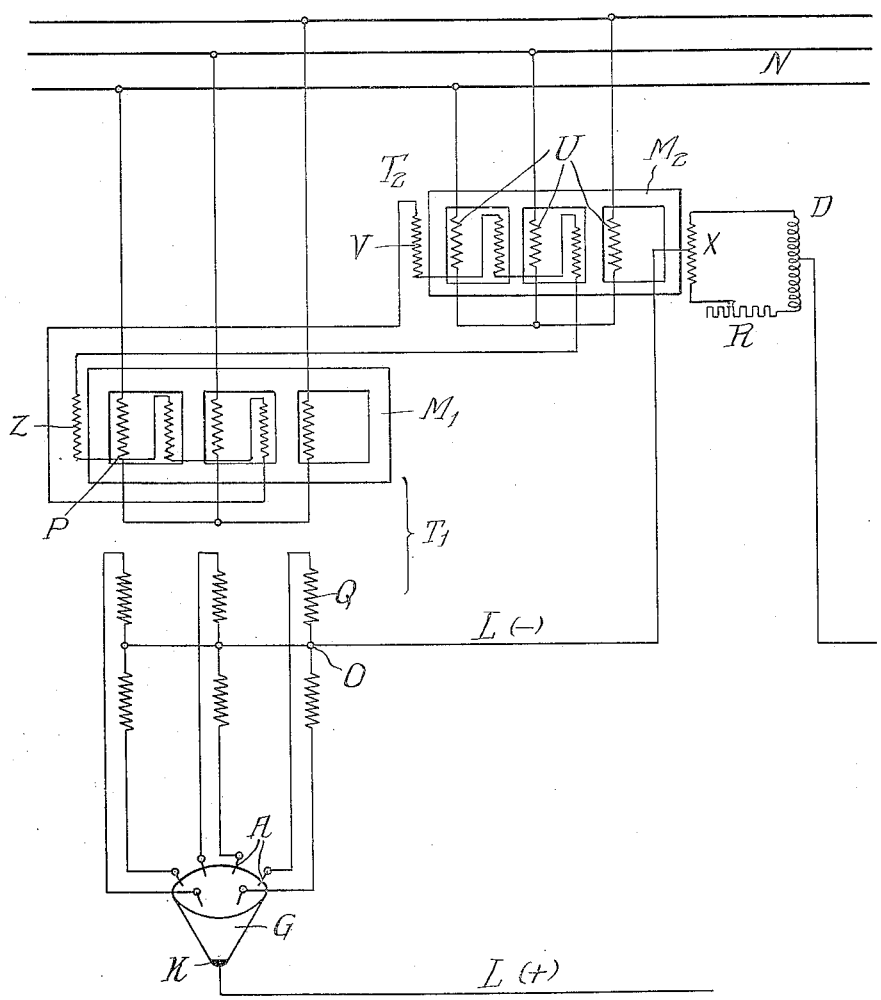

Patented Sept. 17, 1929

1,728,288

UNITED STATES PATENT OFFICE

JULIUS JONAS, OF BADEN, SWITZERLAND, ASSIGNOR TO AKTIENGESELLSCHAFT BROWN, BOVERI & CIE., OF BADEN, SWITZERLAND, A JOINT-STOCK COMPANY, OF SWITZERLAND

RECTIFICATION OF POLYPHASE ELECTRICAL CURRENT

Application filed March 6, 1926, Serial No. 92,685, and in Germany March 21, 1925.

This invention pertains to electrical rectifying apparatus for conversion of alternating current to direct current. It has particular applicability to rectifiers supplied by polyphase transformers.

The general object of the invention is the provision of a method and means for eliminating or preventing the formation of ripples or harmonics in D. C. current rectified from polyphase current.

Other objects will be indicated or pointed out hereinafter or obvious to one skilled in the art upon an understanding of the invention.

In the drawing forming a part of this specification I show various arrangements of apparatus illustrative of the invention, but it is to be understood that the invention is not limited to the employment of devices of the sort shown. In the drawings, Figs. 1, 2 and 3 are diagrams illustrating half portions of voltage waves.

Fig. 4 is a diagram of one arrangement of apparatus illustrative of the invention, Fig. 5 is a diagram of another arrangement of apparatus and Fig. 6 is a diagram illustrating a modification of same.

The voltage on the direct current side of a rectifier supplied by a polyphase transformer is likely to contain a strongly marked ripple which may give trouble in various ways. The effect on the working of neighbouring telephone systems is particularly harmful, the ripple either passing directly into the system or inducing currents in the lines and causing disturbing noises which may in certain circumstances render communication impossible. Moreover, the operation of apparatus and machines using comparatively heavy currents is also adversely affected by these ripples and many attempts have been made to prevent their production and to reduce their effect when once produced.

The present invention proposes to prevent the appearance of the ripple voltage component on the secondary side of the rectifier by some means which are applied to the primary side or to a special auxiliary circuit inductively coupled to the primary circuit of the transformer.

According to the invention the transformer field is given a certain form by exciting harmonic currents in the transformer itself, this form being such that the E. M. F.'s induced in the windings of the separate phases have a flat wave form and hence the voltage in the particular rectifier anode which is carrying current will be approximately uniform during the period in which the current flows. The third harmonic will be found the most satisfactory for use as a superimposed exciting current and in general fulfills all practical requirements, since as the amplitude of this harmonic is approximately 13% of that of the fundamental, it is possible by a suitable choice of the relative position of these current waves to ensure that the voltage wave will be flattened out over one sixth of a period to such an extent that the deviation from an absolutely constant value is only a fraction of one per cent.

It is known that in a three-phase transformer the currents and fields of the third harmonic take parallel paths through the three-phase windings and through the three limbs of the core respectively. Consequently a current of the third harmonic can only flow in a star-connected winding when a connection is made to the neutral point and the fields of the third harmonic will only fully develop in the three limbs when a fourth core is provided to act as a return path for the three parallel fields. Otherwise the return path for the total field of the third harmonic will be through the air space between the two yoke pieces of the transformer. If a fourth core is provided, the winding for exciting the third harmonic may be arranged either on this or on one of the other cores, so that the field of this harmonic takes parallel paths through the windings of the three phases. Instead of one three-phase transformer with a fourth core, three single-phase transformers may be used, each one carrying a winding for the excitation of the third harmonic currents. These three windings are connected in series in such a way that the E. M. F.'s of the three fundamentals cancel out. It is now necessary to decide how the required harmonic frequency is to be maintained. There are several possibilities. A very simple method is to supply the superimposed harmonic exciting current from an auxiliary generator driven by a motor from D. C. or A. C. mains. As the generator has to supply alternating current, it may be designed after the manner of a synchronous alternator with a D. C. excited field, or it may be a commutator generator with field excited by a comparatively small current of the desired frequency. In the first case the generator must be driven by a synchronous motor; in the second case the type of driving motor is a secondary consideration, and a synchronous, induction, or D. C. machine may be employed. If both generator and motor are synchronous machines, the relative positions of the axes of the windings on the two armatures determines the phase relation of the harmonic. This phase relation can be varied by adjusting the relative positions of these axes or by other well-known means, such as inserting resistance, capacity, etc., in the circuit carrying the harmonic. If the generator is a commutator machine, the phase relation of the harmonic is determined by the phase of the generator exciting current. The phase relation of the harmonic may be varied by altering the phase of this exciting current or by the means, referred to above, by which the phase of an alternating current is known to be influenced.

Another method of producing the third harmonic is to connect an auxiliary three-phase transformer having a fourth core to the primary three-phase mains, this transformer being designed to work with the iron very highly saturated. Consequently the field of this transformer will have a flat wave form, which means to say that it contains a strong third harmonic, passing through the fourth core. If this extra core be provided with a winding there will be induced in it a third voltage harmonic, and this may be employed to produce a third harmonic field in the main transformer. Instead of one winding in the fourth transformer core, three windings may be used, one on each of the three cores and connected in series in such a way that the E. M. F.'s of the three fundamentals cancel out.

In whatever way the chief current harmonic is produced, the suppression of the D. C. ripple involves a further circumstance which it is essential to take into consideration. This is the reaction of the D. C. load current on the field of the third harmonic. It is clear that the load current flowing through the secondary windings of the transformer requires a corresponding load current in the primary such that at every instant the secondary ampere-turns will be compensated by the primary ampere-turns. When giving a purely direct current, however, the current in each phase of the transformer secondary contains a component of the third harmonic and, as this third harmonic cannot flow in the star-connected primary windings, the current component of this third harmonic in the load current must be compensated by a current produced in the exciting winding for the third harmonic field. This current weakens the superimposed harmonic field, however, owing to leakage and the consequent voltage drop and it is therefore necessary to compound the source supplying the harmonic current. This compounding effect may be very simply obtained when a synchronous generator is used since it is merely necessary to provide a compound winding which is traversed by the D. C. load current. It is a more difficult matter when a commutator generator is used, since it is necessary to convert a fraction of the D. C. load current into a current of harmonic frequency proportional to the load by some suitable means (e. g. three electrode valves) and to use the harmonic current thus obtained for compounding the commutator generator.

Compounding is also possible when using an auxiliary transformer with high saturation if the saturation is made to depend on the D. C. load current. This can be done by using the D. C. load current to increase the magnetization of the auxiliary transformer and consequently its saturation. It must not be forgotten, however, that a third harmonic E. M. F. will be induced in this compound exciting winding unless certain precautions are taken. These will be described and illustrated by an example later on.

Further details of the subject of the invention may be ascertained by reference to the drawings. It may be premised that the method described is primarily suitable for six-phase rectifiers, a current of the third harmonic being used to provide the superimposed excitation.

The thick lines of Fig. 1 show the well-known form of voltage wave $E_1$ obtained from a six-phase rectifier. During every period each anode provides the D. C. current for a time $t$. The ripple in the direct current has a frequency of six times the fundamental. Fig. 2 shows how by combining the sinusoidal voltage wave $E_1$ with the third harmonic $E_3$ a flattened wave form $E_r$ can be obtained, the height of which may be considered as practically constant over a period equal to or greater than $t$. The thick lines in Fig. 3 show the resulting D. C. voltage wave $E'_r$ of the rectifier when the E. M. F.'s in the phase windings of the transformer are given a wave form corresponding to $E_r$ in Fig. 2. It will be seen that a practically uniform voltage is obtained on the D. C. side.

Fig. 4 shows an example of the application of the method described above. N represents the three-phase mains with the conductors I, II and III of the three phases. P is the star-connected primary winding of the transformer T, which is built with an extra fourth core on which the exciting winding C is placed. Q is the six-phase secondary winding of the transformer T, the ends of which are connected to the anodes A of the rectifier G. The cathode K of the latter supplies the positive wire L of the D. C. system. The negative wire of this system is taken from the star point of the winding Q. D is a synchronous generator supplying winding C with current at the frequency of the third harmonic. The exciting winding E of this generator receives current from the D. C. side of the rectifier through the adjustable resistance R. J is a motor driving generator D. This must also be a synchronous machine, and takes power from the primary mains N.

The third current harmonic passing through the exciting winding C produces a field of the same frequency in the iron core of the transformer T. This field traverses the three main cores and induces E. M. F.'s of the third harmonic in the primary windings. By suitably choosing the phase relation of this superimposed field the resultant E. M. F.'s in the windings of the three phases can be given a flat wave form as shown in Figs. 2 and 3.

In Fig. 4, H represents the compound winding of the generator D. The D. C. load current traverses this winding. The result is that the E. M. F. of the exciting third harmonic is increased in proportion to the decrease of the third harmonic field due to the reaction of the load current.

Fig. 5 shows an example where the current of the third harmonic is produced by a highly saturated transformer. In this Figure N represents the three-phase mains which supply both the main transformer T, and the auxiliary transformer $T_2$. P is the primary winding, Q the secondary winding and Z a tertiary winding of the transformer $T_1$ connected in open delta. U is the primary winding and V the similarly open delta-connected secondary winding of the auxiliary transformer $T_2$. The core frames $M_1$ and $M_2$ of the main and auxiliary transformers respectively are each provided with a fourth iron core. X is a compound winding placed on the fourth core of transformer $T_2$, R an ohmic resistance, and D a choke coil. The remaining reference letters are the same as in Fig. 4. The iron of the auxiliary transformer $T_2$ is worked at a high saturation. Consequently a field of the third harmonic finds a closed path by way of the fourth core of this transformer and induces a voltage harmonic in the winding V. The windings V and Z are connected, and therefore a third current harmonic will flow in this circuit, altering the wave form of the main transformer field in such a way that the E. M. F. wave in each phase of the windings is flat in shape.

The winding X, choke coil D, and resistance R serve for the compounding of the auxiliary source of current $T_2$. As will be seen from Fig. 4, these three auxiliary devices (X, D, and R) are in the main D. C. circuit, the current entering at the middle point of the winding X and leaving at the middle point of the choke coil D. The current is thus divided and flows in two parallel paths, one being direct from X to D and the other from X to D through the resistance R. If the resistance R did not exist the current would be divided equally and the winding X would produce no excitation on the core of $T_2$ as the ampere-turns of the two halves of winding X balance out. The effect of the resistance R is that the current is unequally divided between the two parallel paths and the D. C. currents flowing in winding X therefore produce a steady (D. C.) field in the transformer core, this field being proportional to the D. C. load current. Thus the state of saturation of the auxiliary transformer becomes a function of the rectifier load and consequently the E. M. F. of the third harmonic increases with the load on the rectifier. The third voltage harmonic induced in winding X does not pass into the D. C. system, however, since the points at which the load current enters and leaves in X and D are neutral points with regard to the induced voltage harmonic.

This method of compounding possesses a disadvantage, however, in that the displacement of the alternating field up to the knee of the D. C. saturation curve results in an inequality of the positive and negative halves of the alternating field wave and consequently an unsymmetrical E. M. F. wave. This would lead to other and higher harmonics in the rectifier voltage wave and would prevent the attainment of a supply free from ripples. This disadvantage may obviated, however, by employing, as illustrated in Fig. 6, two highly saturated transformers $T'_2$ and $T''_2$ with their primaries U' and U'' connected in series. Steady (D. C.) fields are produced in these transformers by the rectifier load current in the same manner as before, but the D. C. fields in the two auxiliary transformers are displaced by 180°. Thus, for one half wave of the alternating field of the fundamental the transformer $T'_2$ is at a high saturation point and for the other half wave of this field the transformer T''₂ is at a high saturation. The windings V' and V'' of the two auxiliary transformers are connected in series. This arrangement always gives a symmetrical voltage curve of the harmonic frequency when the D. C. field is increased, at whatever point on the saturation curve of the D. C. field the alternating field is imposed.

As will be seen from Fig. 6, the two auxiliary transformers T'₂ and T''₂ may be combined to form a single unit. The winding halves of X each consist of at least two coils which are arranged alternately on the fourth cores.

The three-phase auxiliary transformer T₂ with fourth core may also be replaced by three single-phase transformers which, in order to produce the same effect as the arrangement in Fig. 6, must be constructed with three limbs. The middle limb will carry the D. C. exciting winding and the outer limbs the windings U' and U'' (likewise V' and V'') connected in series.

What I claim is:

1. A method of repressing ripple effects in the output of polyphase rectifiers which comprises impressing a voltage of harmonic wave form on the polyphase current, and then transforming the current to direct form.

2. A method of repressing ripple effects in the direct current output of polyphase rectifiers which comprises impressing on the polyphase current a voltage corresponding in phase and value to the third harmonic of said current, and then rectifying the current to direct form.

3. A method of repressing ripple effects in the output of rectifiers which comprises impressing on each phase of a polyphase current a voltage varying as the third harmonic of the phase wave, and rectifying the polyphase current to direct current.

4. A method of rectifying polyphase currents to direct current which comprises impressing on each phase of the polyphase current a voltage varying as a harmonic of the phase wave and rectifying the polyphase current.

5. Apparatus for repressing ripple effects in the direct current output of mercury vapour rectifiers, comprising the combination with the rectifier, of a source of polyphase current and means for impressing a harmonic voltage on the polyphase current.

6. Apparatus for repressing ripple effects in the direct current output of polyphase rectifiers, comprising the combination with the rectifier and polyphase current source, of a transformer for the polyphase current, and means for impressing on said transformer a current having the phase relationship of the third harmonic of the polyphase current.

7. Apparatus for repressing ripple effects in the direct current output of polyphase rectifiers, comprising the combination with the rectifier and a source of polyphase current, of a transformer for the rectifier, said transformer having a six-phase secondary winding and a three-phase primary winding supplemented with a fourth phase branch, and means for impressing a harmonic voltage on the fourth branch.

8. Apparatus for repressing ripple effects in the output of mercury vapour rectifiers, comprising the combination with a rectifier and a source of polyphase current, of a transformer having its secondary connected to the rectifier anodes, and means for impressing on the primary of the transformer a current varying as a harmonic of the phase wave.

9. In rectifying apparatus, the combination with a rectifier, of a transformer having its secondary connected to the rectifier input and a second transformer for supplying the primary of the first-mentioned transformer, said second transformer having a branch for deriving a harmonic current component.

10. In a rectifier system, a polyphase rectifier comprising a plurality of star-connected rectifying paths having a common star terminal and a plurality of star end terminals, a polyphase transformer having a star-connected winding system for supplying said star end terminals, a direct current line connected between the star terminal of said rectifier and the star terminal of said transformer, and means associated with said transformer for causing the voltages applied to said rectifier phases to cause successive current flow pulses through the phases of the rectifier with a substantially flat voltage wave.

11. In a rectifier system, a polyphase star-connected rectifier having a common star terminal and a plurality of polyphase star-connected terminals, a polyphase transformer having a plurality of transformer windings connected in star to the polyphase terminals of said rectifier, and means associated with said transformer for causing the voltage wave applied to said rectifier terminals to consist of a succession of flat top overlapping waves of substantially uniform voltage.

12. In a rectifier system, a polyphase star-connected rectifier having a common star terminal and a plurality of polyphase star-connected terminals, a polyphase transformer having a plurality of transformer windings connected in star to the polyphase terminals of said rectifier, and means on said transformer for inducing therein a harmonic voltage to cause the voltage applied to said rectifier to consist of waves having a flattened top portion of substantially uniform voltage during the period at which the respective phases circulate current to said rectifier.

13. In a rectifier system, a triple-phase star-connected rectifier comprising a common star terminal and a plurality of star end terminals, a triple-phase transformer having primary and secondary windings, said secondary windings being connected in star to the phases of said rectifier, and means associated with said transformer for inducing therein a triple harmonic of its fundamental voltage wave.

14. In a rectifier system, a polyphase transformer having a three-phase primary winding and a three-$m$-phase star-connected secondary winding, $m$ being an integer, a three-$m$-phase star-arranged rectifier having its star end terminals connected to the end terminals of said secondary winding, a direct current line connected between the star terminal of said rectifier and the star terminal of said transformer, means for inducing a triple harmonic voltage in the phases of said transformer to flatten the wave shape of the voltage wave applied to said rectifier phases, and means responsive to the magnitude of the direct current flowing in said line for controlling the magnitude of said harmonic voltage.

15. In a rectifier system, a polyphase transformer having a primary winding and a star-connected secondary winding, a star-arranged polyphase rectifier having its star end terminals connected to the phases of said secondary winding, and means responsive to the direct current flow from said rectifier for inducing in said secondary transformer phases a harmonic voltage tending to reduce the ripples in the direct current derived from said rectifier.

16. In a rectifier system, a transformer having a neutral point and a plurality of phase windings connected to said neutral point, said point constituting one direct current terminal, a rectifier having a plurality of rectifying paths including a common terminal, the end terminals of said paths being connected to the free terminals of said transformer phases and said common terminal constituting the other direct current terminal, and means utilizing the direct current derived from said rectifier for inducing in said transformer winding connections a harmonic voltage tending to reduce the voltage ripples in the direct current derived from said rectifier.

In testimony whereof I have hereunto subscribed my name at Zurich, Switzerland, on the 11th day of February A. D. 1926.

JULIUS JONAS.